(12) United States Patent
Wu

(10) Patent No.: US 8,909,059 B2
(45) Date of Patent: Dec. 9, 2014

(54) OPTICAL COMMUNICATION MODULE INCLUDING OPTICAL-ELECTRICAL SIGNAL CONVERTERS AND OPTICAL SIGNAL GENERATORS

(75) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 174 days.

(21) Appl. No.: 13/570,263

(22) Filed: Aug. 9, 2012

(65) Prior Publication Data

US 2014/0233961 A1    Aug. 21, 2014

(30) Foreign Application Priority Data

Dec. 27, 2011    (TW) .................................. 100149023

(51) Int. Cl.
| | | |
|---|---|---|
| H04B 10/00 | (2013.01) | |
| G02B 6/12 | (2006.01) | |
| G02B 6/26 | (2006.01) | |
| G02B 6/42 | (2006.01) | |
| G02B 6/36 | (2006.01) | |
| H04B 10/40 | (2013.01) | |

(52) U.S. Cl.
CPC ...................................... *H04B 10/40* (2013.01)
USPC ............... 398/139; 398/135; 385/14; 385/31; 385/92; 385/93; 385/94

(58) Field of Classification Search
USPC .................. 398/128, 135, 156, 164, 201, 212; 385/14, 31, 92–94
See application file for complete search history.

(56) References Cited

U.S. PATENT DOCUMENTS

| | | | |
|---|---|---|---|
| 8,265,486 B2 * | 9/2012 | Lim et al. ...................... 398/135 |
| 2011/0044367 A1 * | 2/2011 | Budd et al. .................. 372/50.21 |
| 2012/0001166 A1 * | 1/2012 | Doany et al. .................... 257/43 |

* cited by examiner

*Primary Examiner* — David Payne
*Assistant Examiner* — Casey Kretzer
(74) *Attorney, Agent, or Firm* — Novak Druce Connolly Bove + Quigg LLP

(57) ABSTRACT

An optical communication module includes a substrate, an optical signal receiving unit, an optical signal emitting unit and a coupler. The substrate includes a first surface and a second surface. The substrate defines through holes passing through the first and second surfaces. The optical signal receiving unit includes optical-electrical signal converters. The optical signal emitting unit includes optical signal generators. Each of the optical-electrical signal converters and the optical signal generators is mounted on the first surface and aligned with a corresponding one of the through holes. The coupler includes coupling lenses. The coupler is fixed to the second surface. Each of the optical-electrical signal converters and the optical signal generators is aligned with a corresponding coupling lens through the corresponding through hole.

11 Claims, 4 Drawing Sheets

OPTICAL COMMUNICATION MODULE INCLUDING OPTICAL-ELECTRICAL SIGNAL CONVERTERS AND OPTICAL SIGNAL GENERATORS

BACKGROUND

1. Technical Field

The present disclosure relates to an optical communication module which includes optical-electrical signal converters and optical signal generators and is easily assembled.

2. Description of Related Art

An optical communication module includes an input optical fiber, an output optical fiber, an optical signal receiver, an optical signal emitter, and a shell. The shell includes a number of lenses for coupling optical signals between the input optical fiber and the optical signal receiver and optical signals between the output optical fiber and the optical signal emitter. In assembly, the optical signal receiver, the optical signal emitter and the shell are mounted on a surface of a substrate, and the shell covers the optical signal receiver and the optical signal emitter. Therefore, it is required that the optical signal receiver and the optical signal emitter are mounted on the substrate before the shell. To ensure alignments between the optical signal receiver, the optical signal emitter, and the respective lenses, it is required that the optical signal receiver and the optical signal emitter are located to preset positions. Specific position tolerances of the optical signal receiver and optical signal emitter and a relative position tolerance are required to be in respective acceptable ranges, which is difficult to achieve.

What is needed therefore is an optical communication module, a chip assembling method and an optical coupler addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
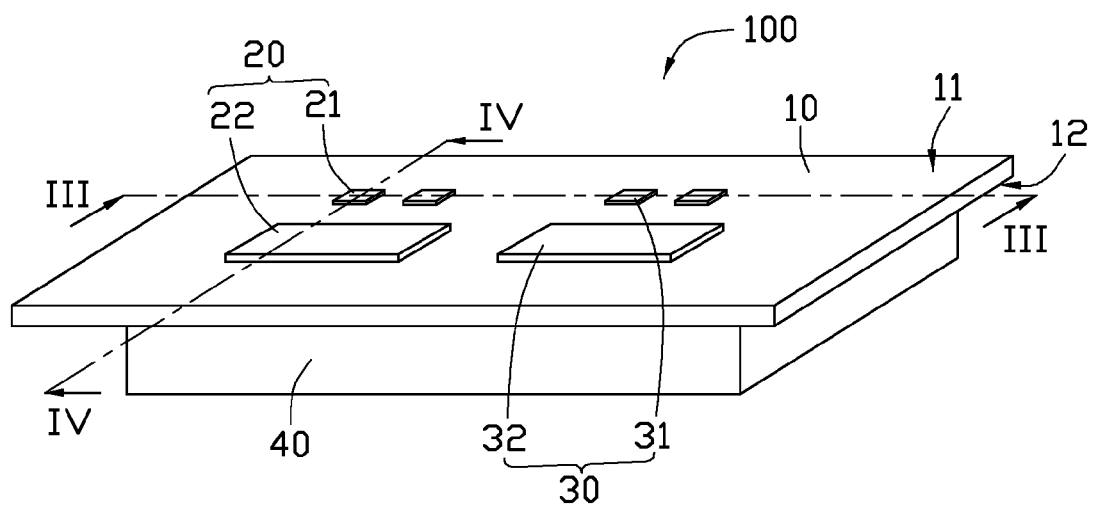
FIG. 1 is an isometric view of an optical communication module, according to an exemplary embodiment of the present disclosure.

Referring to FIG. 1, an optical communication module 100, according to an exemplary embodiment, is shown. The optical communication module 100 includes a substrate 10, an optical signal receiving unit 20, an optical signal emitting unit 30, and a coupler 40.

Figure 2:
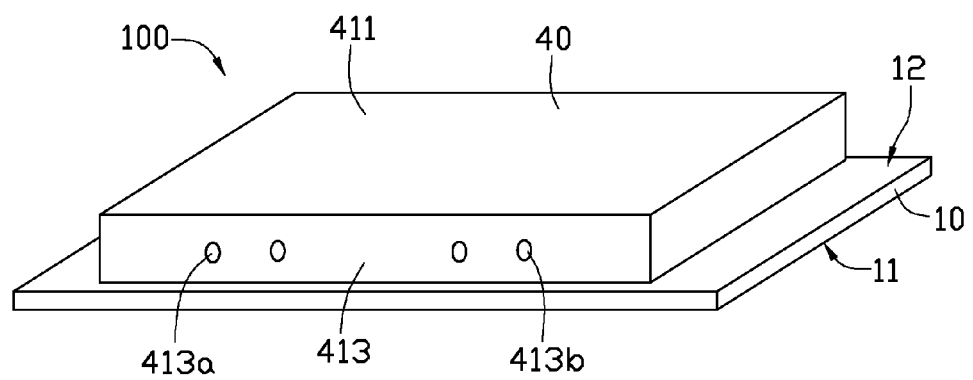
FIG. 2 is similar to FIG. 1, but shows the optical communication module from another angle.
Figure 3:
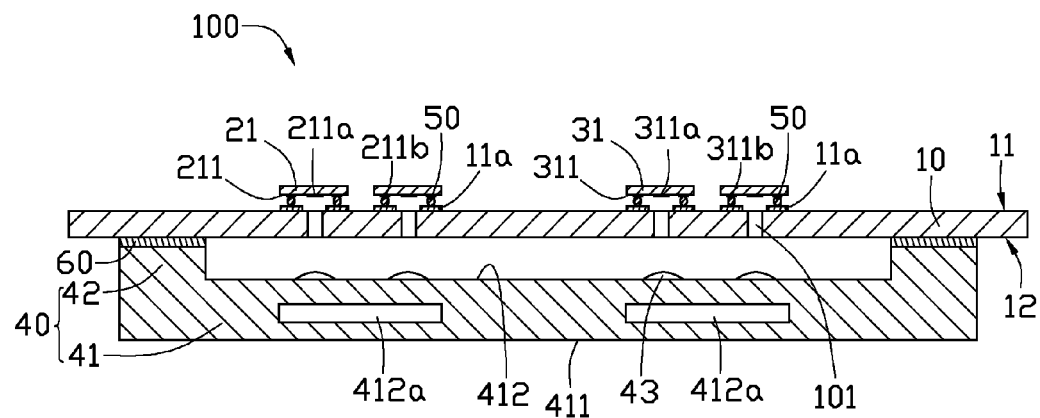
FIG. 3 is a cross-sectional view of the optical communication module of FIG. 1, taken along line III-III.
Figure 4:
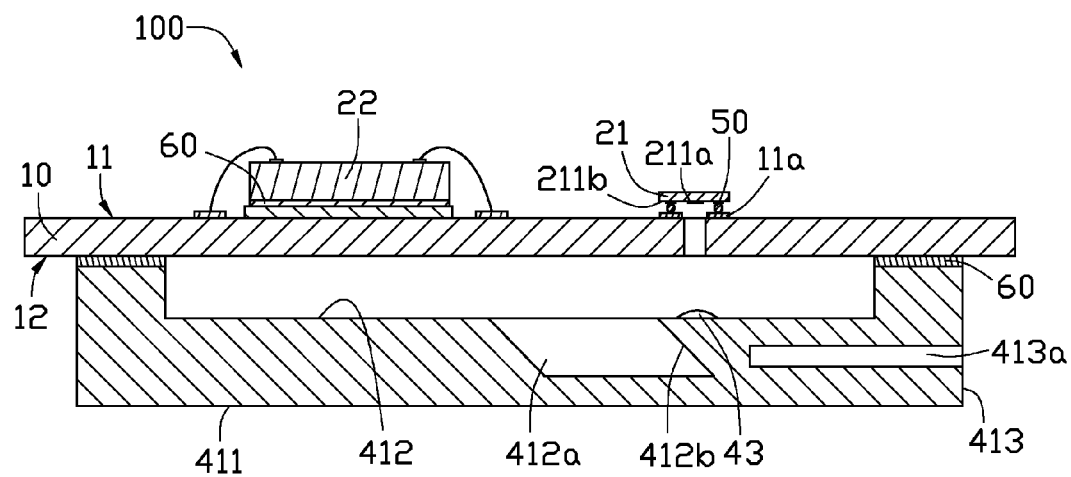
FIG. 4 is a cross-sectional view of the optical communication module of FIG. 1, taken along line IV-IV.

Also referring to FIGS. 2-4, the substrate 10 includes a first surface 11 and an opposite second surface 12. The substrate 10 defines a number of through holes 101 passing through the first surface 11 and the second surface 12. The through holes 101 allow light passing therethrough. The substrate 10 includes a number of connecting pads 11a formed on the first surface 11. In the embodiment, the substrate 10 is a printed circuit board (PCB).

The optical signal receiving unit 20 includes a number of optical-electrical signal converters 21 and an amplifier 22 electrically connected to the optical-electrical signal converters 21.

The optical-electrical signal converters 21 convert optical signals into corresponding electrical signals. Each optical-electrical converter 21 includes a receiving surface 211, a receiving portion 211a for receiving optical signals and a number of conductive pins 211b for inputting/outputting electrical signals. The receiving portion 211a is formed at a center portion of the receiving surface 211, and the pins 211b are formed at a periphery portion of the receiving surface 211. The optical-electrical signal converters 21 are mounted on the first surface 11 with the receiving surface 211 opposing to the first surface 11. Each conductive pin 211b is electrically connected to the substrate 10 via a corresponding soldering ball 50 mounted on a respective connecting pad 11a. Each optical-electrical converter 21 is aligned with a corresponding through hole 101. In the embodiment, the optical-electrical signal converters 21 are photodiodes.

The amplifier 22 amplifies electrical signals converted by the optical-electrical signal converters 21. The amplifier 22 is mounted on the first surface 11 and electrically connected to the substrate 10 by a number of conductive wires (not labeled). In the embodiment, the amplifier 22 is fixed on the first surface 11 by an adhesive 60.

The optical signal emitting unit 30 includes a number of optical signal generators 31 and a driving chip 32 electrically connected to the optical signal generators 31.

The optical signal generators 31 generate optical signals. Each optical signal generator 31 includes an emitting surface 311, an emitting portion 311a for emitting optical signals and a number of conductive pins 311b for inputting/outputting electrical signals. The emitting portion 311a is formed at a center portion of the emitting surface 311, and the conductive pins 311b are formed at a periphery portion of the emitting surface 311. The optical signal generators 31 are mounted on the first surface 11 with the emitting surface 311 opposing to the first surface 11 Each conductive pin 311b is electrically connected to the substrate 10 via a corresponding soldering ball 50 mounted on a respective connecting pad 11a. Each optical signal generator 31 is aligned with a corresponding through hole 101. In the embodiment, the optical signal generators 31 are vertical cavity surface emitting lasers (VCSEL).

The driving chip 32 drives the optical signal generators 31 to generate optical signals. The driving chip 32 is mounted on the first surface 11 of the substrate 10 via a manner similar to the amplifier 22. Alternatively, the amplifier 22 and the driving chip 32 can be mounted on the second surface 12 of the substrate 10.

The coupler 40 is connected to the second surface 12 of the substrate 10. The coupler 40 includes a main portion 41 and a supporting portion 42 connected to the main portion 41.

The main portion 41 is made from a transparent material. The main portion 41 includes an outer surface 411 facing away from the substrate 10 and an inner surface 412 facing the substrate 10 and a side surface 413. The outer surface 411 and the inner surface 412 are substantially parallel to each other, and the side surface 413 is substantially perpendicular to the outer surface 411 and the inner surface 412. The main portion 41 includes a number of coupling lenses 43 formed on the inner surface 412. Each of the optical-electrical signal converters 21 and the optical signal generators 31 is spatially corresponded to a respective one of the coupling lenses 43. A central axis of each coupling lens 43 is substantially perpendicular to the inner surface 412. The main portion 41 defines two grooves 412a in the inner surface 412, a number of first fixing holes 413a and a number of second fixing holes 413b in the side surface 413. One of the grooves 412a spatially corresponds to the optical-electrical signal converters 21, and the other one of the grooves 412a spatially corresponds to the optical signal generators 31. Each of the grooves 412a has a reflecting surface 412b. The reflecting surface 412b is inclined with respective to the inner surface 412. Each first fixing hole 413a spatially corresponds to an optical-electrical converter 21, and each second fixing hole 413b spatially corresponds to an optical signal generator 31. Each of the first fixing holes 413a and the second fixing holes 413b fixes an end of an optical fiber (not shown). A central axis of each of the first fixing holes 413a and the second fixing holes 413b is substantially parallel to the inner surface 412. In the embodiment, the central axis of each coupling lens 43 and the central axis of a corresponding one of the first fixing holes 413a and the second fixing holes 413b are substantially perpendicular to each other and intersected at a point on a respective reflecting surface 412b. An included angle between the central axis of each coupling lens 43 and the respective reflecting surface 412b is the same as an included angle between the central axis of each of the first fixing holes 413a and the second fixing holes 413b and the respective reflecting surface 412b.

The supporting portion 42 upwardly protrudes a distance from the inner surface 412. The supporting portion 42 is fixed on the second surface 12 of the substrate 10 by an adhesive 60. Each coupling lens 43 is aligned with a corresponding through hole 101.

In assembly, the coupler 40 is fixed to the second surface 12 of the substrate 10 first, with each of the coupling lenses 43 aligned with a corresponding through hole 101. Then, the optical-electrical signal converters 21 and the optical signal generators 31 are mounted on the first surface 11, with each of the receiving portions 211a and the emitting portions 311a aligned with a corresponding coupling lens 43 through the corresponding through hole 101. It is convenient to adjust the relative positions between the receiving portions 211a, the emitting portions 311a and the coupling lenses 43. Therefore, an assembly precision of the optical communication module 100 is ensured.

In the embodiment, the number of the optical-electrical signal converters 21, the optical signal generators 31, the first fixing holes 413a and the second fixing holes 413b are respectively two. Thus, the optical communication module 100 can connect to two input optical fibers and two output optical fibers. In other embodiments, the number of the optical-electrical signal converters 21, the optical signal generators 31, the first fixing holes 413a and the second fixing holes 413b can be respectively one or more than two.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical communication module, comprising:
    a substrate comprising a first surface and an opposite second surface, the substrate defining a plurality of through holes passing through the first surface and the second surface;
    an optical signal receiving unit comprising at least one optical-electrical signal converter for converting optical signals into corresponding electrical signals, each of the at least one optical-electrical signal converter being mounted on the first surface and aligned with a corresponding one of the through holes;
    an optical signal emitting unit comprising at least one optical signal generator for generating optical signals, each of the at least one optical signal generator being mounted on the first surface and aligned with a corresponding one of the through holes; and
    a coupler comprising a plurality of coupling lenses, the coupler being mounted on the second surface of the substrate, and each of the at least one optical-electrical signal converter and the at least one optical signal generator being aligned with a corresponding one of the coupling lenses through the corresponding through hole;
    wherein the coupler comprises a main portion and a supporting portion connected to the main portion, the coupling lenses are formed on the main portion, and the supporting portion is fixed to the second surface of the substrate, the main portion comprises an outer surface facing away from the substrate, an inner surface facing the substrate and a side surface, the outer surface and the inner surface are substantially parallel to each other, the side surface is substantially perpendicular to the outer surface and the inner surface, the coupling lenses is formed on the inner surface, and a central axis of each coupling lens is substantially perpendicular to the inner surface.

2. The optical communication module of claim 1, wherein each optical-electrical signal converter comprises a receiving surface and a receiving portion formed at a center portion of the receiving surface, each optical-electrical signal converter is mounted on the first surface with the receiving surface opposing to the first surface.

3. The optical communication module of claim 2, wherein each optical-electrical signal converter comprises a number of conductive pins formed at a periphery portion of the receiving surface, each conductive pin is electrically connected to the substrate.

4. The optical communication module of claim 1, wherein the optical signal receiving unit comprises an amplifier for amplifying the electrical signals converted by the at least one optical-electrical signal converter, and the amplifier is mounted on the first surface and electrically connected to the substrate.

5. The optical communication module of claim 1, wherein each optical-electrical signal converter is a photodiode.

6. The optical communication module of claim 1, wherein each optical signal generator comprises an emitting surface and an emitting portion formed at a center portion of the emitting surface, each optical signal generator is mounted on the first surface with the emitting surface opposing to the first surface.

7. The optical communication module of claim 6, wherein each optical signal generator comprises a number of conductive pins formed at a periphery portion of the emitting surface, and each conductive pin is electrically connected to the substrate.

8. The optical communication module of claim 1, wherein the optical signal emitting unit comprises a driving chip for driving the at least one optical signal generator to generate optical signals, and the driving chip is mounted on the first surface and electrically connected to the substrate.

9. The optical communication module of claim 1, wherein the main portion defines two grooves in the inner surface, at least one first fixing hole and at least one second fixing holes in the side surface, one of the grooves spatially corresponds to the at least one optical-electrical signal converter, the other one of the grooves spatially corresponds to the at least one optical signal generator, each first fixing hole spatially corresponds to a respective one of the at least one optical-electrical signal converter, and each second fixing hole spatially corresponds to a respective one of the least one optical signal generator.

10. The optical communication module of claim 9, wherein each of the grooves has a reflecting surface, the reflecting surface is inclined with respective to the inner surface, a central axis of each of the at least one first fixing hole and the at least one second fixing hole is substantially parallel to the inner surface.

11. The optical communication module of claim 10, wherein the central axis of each coupling lens and the central axis of a corresponding one of the at least one first fixing hole and the at least one second fixing holes are substantially perpendicular to each other and intersected at a point on the respective reflecting surface, an included angle between the central axis of each coupling lens and the respective reflecting surface is the same as an included angle between the central axis of each of the at least one first fixing hole and the at least one second fixing hole and the respective reflecting surface.

\* \* \* \* \*